(12) United States Patent
Thomas et al.

(10) Patent No.: US 11,615,467 B2
(45) Date of Patent: Mar. 28, 2023

(54) SYSTEMS AND METHODS FOR PRE-APPROVING AND PRE-UNDERWRITING CUSTOMERS FOR FINANCIAL PRODUCTS

(71) Applicant: JPMORGAN CHASE BANK, N.A., New York, NY (US)

(72) Inventors: W. David Thomas, Glassboro, NJ (US); Claimonte Nelson, Millstone Township, NJ (US); Dennis Bowers, Middletown, DE (US); Michael S. Hartman, Wilmington, DE (US); Steven Noel Roth, Ridgewood, NJ (US); Jagan Devisetty, Newark, DE (US); Nagesh Chalasani, Frisco, TX (US); Jason J. Kim, Wyckoff, NJ (US); Marianna Dulkina, Columbus, OH (US); Suzanne Dimant, Dumont, NJ (US); Vakul Garg, Lutz, FL (US); Ajit Nalla, Landenberg, PA (US); Daniel A. Haas, Wilmington, DE (US); James Hennessey, Chadds Ford, PA (US); Keith Reichenbach, Mullica Hill, NJ (US); Richard S. Bunke, Toughkenamon, PA (US); Seth Goldkrantz, Phoenix, AZ (US); Stephani L. Breault, Chandler, AZ (US); Steven Aller, West Chester, PA (US); Vidyasankar Narayanan, New Castle, DE (US); Wade A. Stratton, Morgantown, PA (US); Margaret F. Evans, New York, NY (US); Kapil Bansal, Kennett Square, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/905,740

(22) Filed: Jun. 18, 2020

(65) Prior Publication Data
US 2020/0402162 A1    Dec. 24, 2020

Related U.S. Application Data

(60) Provisional application No. 62/863,600, filed on Jun. 19, 2019.

(51) Int. Cl.
*G06Q 40/02*    (2012.01)
*G06Q 30/0207*    (2023.01)
*G06Q 30/0251*    (2023.01)

(52) U.S. Cl.
CPC ....... *G06Q 40/025* (2013.01); *G06Q 30/0224* (2013.01); *G06Q 30/0251* (2013.01)

(58) Field of Classification Search
CPC ............. G06Q 40/025; G06Q 30/0224; G06Q 30/0251
See application file for complete search history.

(56) References Cited

U.S. PATENT DOCUMENTS

| 10,210,548 B1 * | 2/2019 | Wai | G06Q 30/0247 |
| 2011/0231233 A1 * | 9/2011 | Iannace | G06Q 30/0224 705/14.13 |

(Continued)

*Primary Examiner* — Scott C Anderson
(74) *Attorney, Agent, or Firm* — Greenberg Traurig LLP (57) ABSTRACT

A method for presenting pre-approved and pre-underwritten offers to a customer may include: receiving targeting criteria based on at least one of current accounts with the financial institution, assets, creditworthiness, and credit risk for an offer for a financial product; identifying a target population of customers for the offer by applying the targeting criteria to a population of customers; reviewing each customer in the target population for underwriting for the financial product based on inferred income for each customer and accounts that each customer has with the financial institution, wherein (Continued)

the underwriting is performed before the financial product is offered; determining a channel to present the offer to one of the customers that passed underwriting; communicating the offer to the customer over the selected channel; and providing an accepted offer to a fulfilment engine, wherein the fulfilment engine initiates an account opening for the financial product.

18 Claims, 4 Drawing Sheets

(56) References Cited

U.S. PATENT DOCUMENTS

| | | | |
|---|---|---|---|
| 2015/0066740 A1* | 3/2015 | DiCarlo | G06Q 40/04 705/38 |
| 2016/0171555 A1* | 6/2016 | Buerger | G06Q 30/0201 705/14.66 |
| 2017/0169478 A1* | 6/2017 | Dey | G06Q 30/0255 |
| 2017/0323345 A1* | 11/2017 | Flowers | G06F 17/18 |
| 2018/0014077 A1* | 1/2018 | Hou | H04N 21/26233 |
| 2018/0122001 A1* | 5/2018 | Bhattacharya | G06Q 40/025 |
| 2019/0080351 A1* | 3/2019 | Garg | G06Q 30/0253 |

* cited by examiner

SYSTEMS AND METHODS FOR PRE-APPROVING AND PRE-UNDERWRITING CUSTOMERS FOR FINANCIAL PRODUCTS

RELATED APPLICATIONS

This application claims the benefit of, and priority to, U.S. Provisional Patent Application Ser. No. 62/863,600, filed Jun. 19, 2019 is hereby incorporated, by reference, in its entirety.

BACKGROUND OF THE INVENTION

1. Field of the Invention

Embodiments are generally directed to systems and methods for pre-approving and pre-underwriting customers for financial products.

2. Description of the Related Art

Consumers often receive offers from financial institutions for financial products for which they are "pre-approved." The consumer, however, still has to go through the application process for the financial product, and the actual decisioning is not made until after the application process is complete.

SUMMARY OF THE INVENTION

Systems and methods for pre-approving and pre-underwriting customers for financial products are disclosed. According to one embodiment, in a financial institution information processing apparatus comprising at least one computer processor, a method for presenting pre-approved and pre-underwritten offers to a customer may include: (1) receiving targeting criteria for an offer for a financial product, wherein the targeting criteria is based on at least one of current accounts with the financial institution, assets, creditworthiness, and credit risk; (2) identifying a target population of customers for the offer by applying the targeting criteria to a population of customers, wherein the target population is a subset of the population; (3) reviewing each customer in the target population for underwriting for the financial product based on inferred income for each customer and accounts that each customer has with the financial institution, wherein the underwriting is performed before the financial product is offered; (4) determining a channel to present the offer to one of the customers that passed underwriting; (5) communicating the offer to the customer over the selected channel; and (6) providing an accepted offer to a fulfilment engine, wherein the fulfilment engine initiates an account opening for the financial product.

In one embodiment, wherein the population of customers may include customers of the financial institution.

In one embodiment, the targeting criteria may be further based on a likelihood that the customer will not default on the account.

In one embodiment, the communication channel may include at least one of text messaging, in-app messaging, browser-based messaging, and email.

In one embodiment, the communication channel may include a third-party provider of goods or services associated with the financial product.

In one embodiment, the underwriting may include a plurality of levels, and the customer is approved for one of the plurality of levels. Each level may be associated with a term for the financial product, the term including at least one of an interest rate and an amount.

In one embodiment, the customer may be approved for a plurality of offers, and the method may further include prioritizing the offers to the customer. The offers may be presented in the prioritized order. In one embodiment, the priority may be based on an anticipated acceptance probability of each offer.

In one embodiment, the offer may be presented with dynamic and static content.

According to another embodiment, a system for presenting pre-approved and pre-underwritten offers to a customer may include a marketing campaign management service; an offer eligibility service; a credit decisioning service; a content presentation engine; a plurality of systems of record; an offer acceptance engine; a fulfilment engine; and a database comprising a customer profiles for a population of customers. The marketing campaign management service may provide targeting criteria for an offer for a financial product, wherein the targeting criteria is based on at least one of current accounts with the financial institution, assets, creditworthiness, and credit risk. The offer eligibility service may identify a target population of customers for the offer by applying the targeting criteria to the population of customers in the database, wherein the target population is a subset of the population of customers. The credit decisioning service may review each customer in the target population for underwriting for the financial product based on inferred income for each customer and accounts that each customer has with the financial institution from the systems of record, wherein the underwriting is performed before the financial product is offered. The offer eligibility service may determine a channel to present the offer to one of the customers that passed underwriting. The content presentation engine may communicate the offer to the customer over the selected channel. The offer acceptance engine may provide an accepted offer to a fulfilment engine, wherein the fulfilment engine initiates an account opening for the financial product.

In one embodiment, the population of customers may include customers of the financial institution.

In one embodiment, the targeting criteria may be further based on a likelihood that the customer will not default on the account.

In one embodiment, the communication channel may include at least one of text messaging, in-app messaging, browser-based messaging, and email.

In one embodiment, the communication channel may include a third-party provider of goods or services associated with the financial product.

In one embodiment, the underwriting may include a plurality of levels, and the customer may be approved for one of the plurality of levels. Each level may be associated with a term for the financial product, the term including at least one of an interest rate and an amount.

In one embodiment, the customer may be approved for a plurality of offers, and the offer eligibility service prioritizes the offers and presents the offers in the prioritized order. The priority may be based on an anticipated acceptance probability of each offer.

In one embodiment, the offer may be presented with dynamic and static content.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

Embodiments are directed to systems and methods for pre-approving and pre-underwriting customers for financial products. Embodiments provide customers with the convenience of one-click access to pre-approved and pre-underwritten offers, the confidence that the financial institution making the offer will deliver the offer, and the choice of a solution that best fits their needs. Even if a desired solution is not available to the customer, the financial institution may offer tips and other planning tools to assist in improving the customer's financial health in order to qualify.

Figure 1:
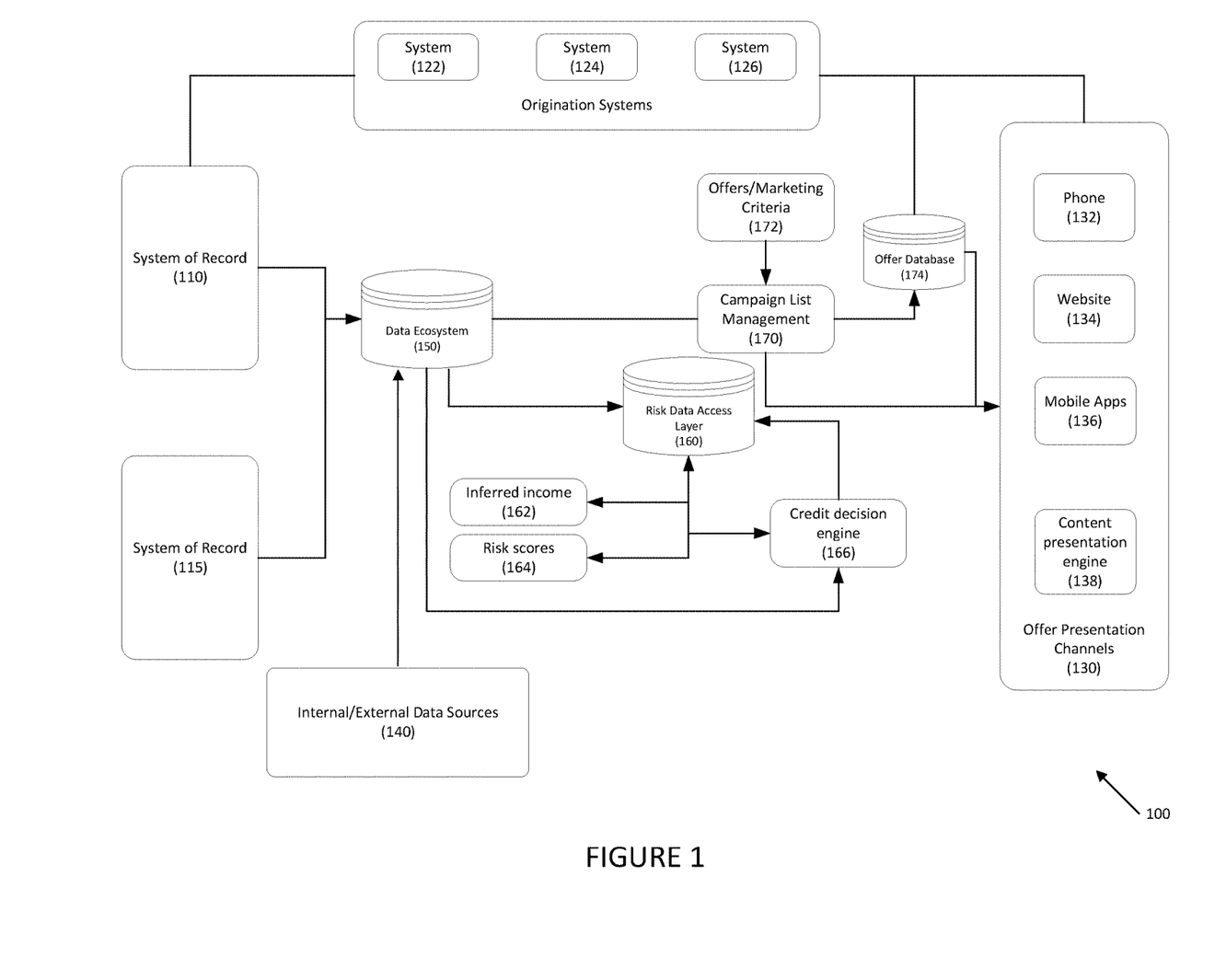
FIG. 1 depicts an architectural diagram of a system for pre-approving and pre-underwriting customers for financial products according to one embodiment.

Referring to FIG. 1, an architectural diagram of a system for pre-approving and pre-underwriting customers for financial products is disclosed according to one embodiment. Although certain systems and devices may be illustrated in FIG. 1, it should be recognized that these systems are exemplary only and other systems and devices that perform similar functions may be employed as is necessary and/or desired.

System 100 may include one or more system of record, such as systems of record 110 and 115. Any suitable number of systems of record may be provided as is necessary and/or desired. Examples of systems of record 110, 115 include loan account systems of record, deposit account systems of record, etc. Systems of record 110 or 115 may provide account balances, suspicious activity warnings, customer updates, etc. to data ecosystem 150.

One or more system of record 110, 115 may communicate with one or more origination system 122, 124, 126. Although three origination systems 122, 124, 126 are depicted in FIG. 1, it should be recognized that greater or fewer origination systems may be provided as is necessary and/or desired. Examples of origination systems include credit card origination system 122, auto origination system 124, mortgage origination system 126. Each origination system 122, 124, 126 may be associated with one or more system of record 110, 115.

Origination systems 122, 124, 126 may book or open an account with one or more system of record 110, 115.

Data ecosystem 150 may also receive data from other internal or external data systems 140. Examples of external or internal data sources include credit bureaus, income/asset data, and mortgage offer targeting systems.

Data ecosystem 150 may integrate the risk decision with the offer, customer data, and account data. The combined data may be used to drive the content that is displayed to the customer.

Data ecosystem 150 may provide risk input data as an input to risk data access layer 160. Risk data access layer 160 may receive customer data, including inferred income 162, risk scores 164, and may determine a credit risk profile for the customer. Risk data access layer 160 may provide an output to credit decision engine 166, such as credit risk worthiness for the customer, which may also receive account, customer, and external data (e.g., credit bureau data) and provide risk-credit qualification data to risk data access layer 160.

Risk data access layer 160 may provide risk-credit qualification data to marketing campaign list management 170, which may also receive account/customer data from data ecosystem 150. Marketing campaign list management 170 may receive defined offers and targeting criterial from marketing defined offers and targeting criteria source 172, and may output targeted offer details to offer database 174, which may hold pre-approved, pre-underwritten offers that have been targeted to customer. It may also output customer/offer targeting data to offer presentation channels 130, which may include phone channel 132, website channel 134, and mobile app channel 136. Content presentation engine 138 may provide offer display rules to certain channels (e.g., website channel 134 and mobile app channel 136) to control how the offers are presented to the customer.

The customer may accept an offer presented on one of channels 132, 134, 136, and then an appropriate origination system 122, 124, 126 may open an account with the appropriate system of record 110, 115.

In embodiments, the customer is truly pre-approved and pre-underwritten for the targeted offers that are presented, as income and assets may be either reported by the customer as part of the relationship, inferred from employer direct deposits, mortgage data, credit card data, auto and other loan data, deposit account balances, etc. Risk may further be assessed from external data, such as credit bureau data. Thus, embodiments may reduce or eliminate friction for the customer in the process of viewing and accepting offers.

Embodiments may provide coordination between the pre-approval decision and the underwriting decision post acceptance to ensure consistent customer treatment.

Figure 2:
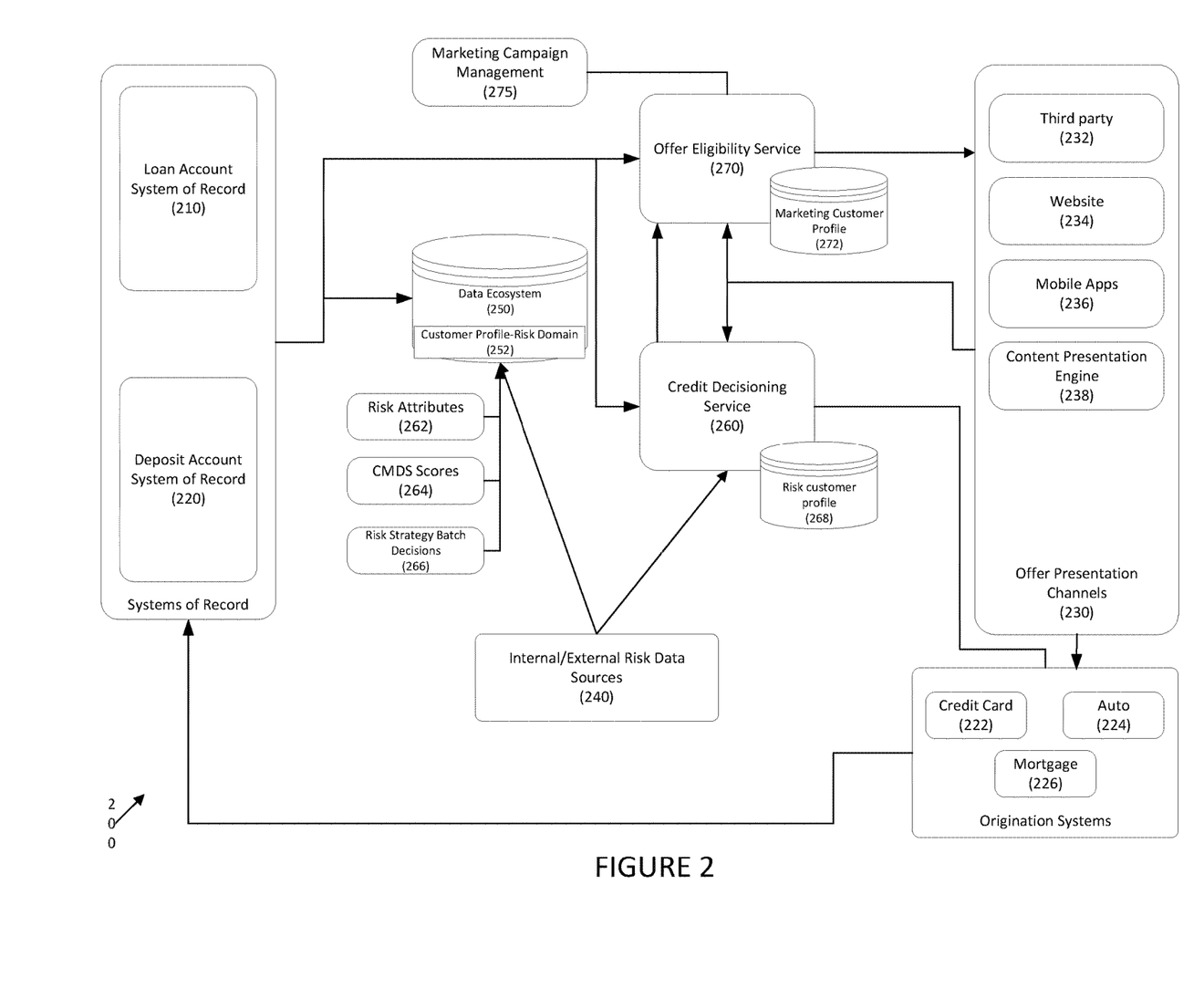
FIG. 2 depicts an architectural diagram of a system for pre-approving and pre-underwriting customers for financial products according to another embodiment.

Referring to FIG. 2, an architectural diagram of a system for pre-approving and pre-underwriting customers for financial products is disclosed according to another embodiment. Although certain systems and devices may be illustrated in FIG. 2, it should be recognized that these systems are exemplary only and other systems and devices that perform similar functions may be employed as is necessary and/or desired.

System 200 may include one or more system of record, for example, loan account system of record 210 and deposit account system of record 215. Although two systems of record are depicted in FIG. 2, it should be recognized that greater or fewer systems of record may be included as is necessary and/or desired.

Systems of record 210, 215 may provide data ecosystem 250 with account information, customer information, balance information, and transaction information. Data ecosystem 250 may further receive risk attributes 262, credit scores 264, batch risk strategy decisions 266, and internal/external risk data from internal/external risk data sources 240. Examples of internal/external risk data sources 240 include credit bureaus, vehicle data, income/asset data, asset data from third parties, Know Your Customer (KYC)/Anti Money Laundering (AML) data, customer account profitability, loan level loss forecasting data, etc. Other internal/external risk data sources may be included as is necessary and/or desired.

In one embodiment, customer profile-risk domain 252 may be a copy of the customer's risk customer profile 268 in the data ecosystem. The customer profile-risk domain 252 may be used for analytics.

Credit decisioning service 260 may receive customer, account, and transaction event streaming data from one or more of systems of record 210, 215. It may further receive input data for credit decisioning from data ecosystem 250, and real-time third-party risk data from internal/external risk data sources 240. It may output credit eligibility change events to data ecosystem 250, and may provide a real-time credit decision to origination systems, such as credit card origination system 222, automobile loan origination system 224, and mortgage origination system 226. It may also receive customer supplied information from channels (e.g., web, mobile, phone, etc.).

Offer eligibility service 270 may receive marketing product and offer information from marketing campaign management 275, and may output offer eligibility change events to offer presentation channels, including third parties 232 (e.g., partners, such as auto manufacturers, dealers, real estate agencies, etc.), websites 234, mobile applications 236, etc. Content presentation engine 238 may provide offer display rules to certain channels (e.g., website channel 134 and mobile app channel 136) to control how the offers are presented to the customer.

In one embodiment, credit decisioning service 260 and/or offer eligibility service 270 may implement machine learning in order to make underwriting decisions and to identify customers to target and/or to make offers. Examples of suitable machine learning models that may be implemented are disclosed in U.S. patent application Ser. No. 16/413,085, filed May 15, 2019, the disclosure of which is hereby incorporated by reference in its entirety. Although the disclosure in this document is in the context of fraud identification, it should be recognized that the machine learning modules disclosed in this incorporated document have applicability in targeting customers, underwriting customers, identifying content to provide to customers, identifying a communication channel to communicate the offer to the customer, as well as other aspects of this disclosure.

In embodiments, a real-time and event based common service for (Risk) offer pre-approval and credit decisioning may be provided.

In embodiments, a real-time and event based marketing service may be provided to determine the products and offers that a customer is eligible for.

Embodiments may use event streaming to provide services and channel applications a current and consistent view of what customers are eligible for.

Embodiments may reduce or eliminate manual business processes.

Figure 3:
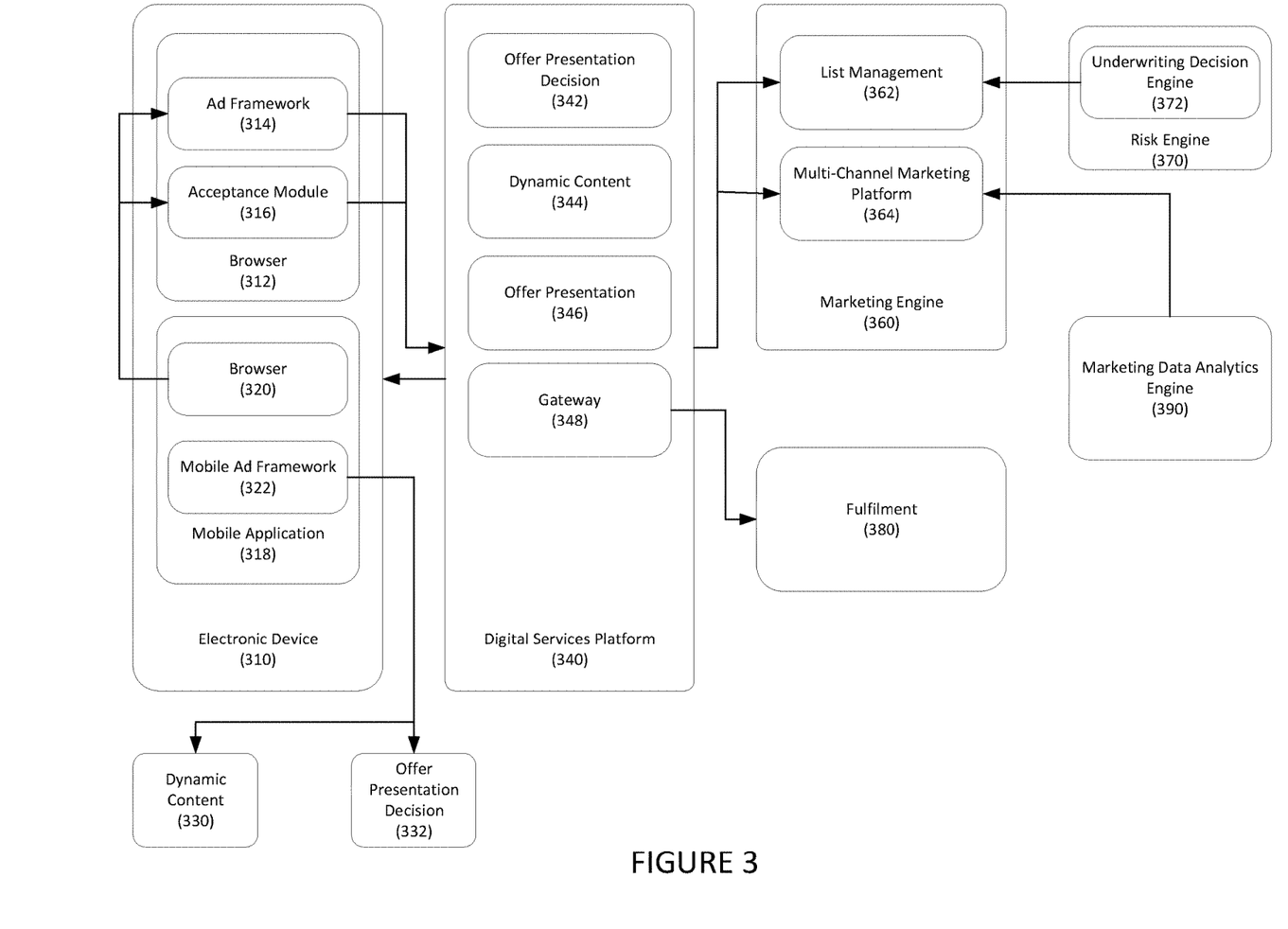
FIG. 3 depicts a diagram of an offer presentation system for pre-approved and pre-underwritten offers according to one embodiment.

Referring to FIG. 3, a diagram of an offer presentation system for pre-approved and pre-underwritten offers is disclosed according to one embodiment. Although certain systems and devices may be illustrated in FIG. 3, it should be recognized that these systems are exemplary only and other systems and devices that perform similar functions may be employed as is necessary and/or desired.

In FIG. 3, electronic device 310 (e.g., a smart phone, smart watch, computer, Internet of Things appliance, etc.) may receive pre-approved and pre-underwritten offers. In one embodiment, the digital asset may present the already-approved offer as combined customer borrowing power, or as one product offer. The offer may be made anywhere in the customer lending lifecycle, including at a point of sale device, via a third-party APIs, from a search within assets of the financial institution, etc.

In one embodiment, consumer electronic device may use browser 312 that may provide ad framework 314, and/or mobile application 318 that may provide mobile ad framework 322. Browser 312 may include acceptance module 316, which is where the customer may accept an offer.

Browser 320 may be a browser that is embedded within mobile application 318.

Ad framework 314 and mobile ad framework 322 may request the marketing decision, assemble offer content, and present the offer to the customer. Ad framework 314 and mobile ad framework 322 may include advertisements in the offers.

Digital services platform 340 may provide offers to customer by managing customer offer details, providing intelligence regarding how or what offers to provide, providing details of the offers that the customer accepts (e.g., clicks), and may provide information on acceptance and details to fulfilment services. For example, digital services platform 340 may provide e re-usable content templates that may vary by product, customer, etc.

In one embodiment, digital services platform 340 may include offer presentation decision module 342, dynamic content generation module 344, offer presentation module 346, and gateway 348. Offer presentation decision module 342 may decide which offer(s) to present to the customer, which may be dynamically selected. Offer presentation module 146 may provide the static portion of offer content to be displayed.

Dynamic content generation module 344 may generate dynamic content to be displayed on consumer device 310 (e.g., in browser 312 or mobile application 318). Dynamic content may include customer-specific content, such as the customer name, and offer-specific content, such as a credit line, interest rate, other terms, etc. In one embodiment, as discussed above, machine learning may be used to identify at least some of the dynamic content.

Gateway 348 may provide a gateway to fulfilment services 380. In embodiments, gateway 348 may facilitate a flow to originate accounts with fulfilment services 380 so that fulfilment services 380 can initiate account opening with the appropriate system in one or more core platform.

Marketing engine 360 may include list management module 362 that may manage offers and offer criteria, and multi-channel marketing platform 364 that facilitates marketing by various channels, such as browser-based ads, in-app ads, emails, etc. In one embodiment, marketing engine 360 may determine which customers are eligible and targeted for the various types of offers. The eligibility and targeting information is provided to other applications in order to deliver offers via the different channels, such as browser-based ads, in-app ads, email campaigns, and direct mail.

In one embodiment, marketing engine 360 may implement machine learning in order to target customers. Examples of suitable machine learning models that may be implemented are disclosed in U.S. patent application Ser. No. 16/413,085, filed May 15, 2019.

Risk engine 370 may include underwriting decision engine 372 that may perform underwriting decision. In one embodiment, risk engine 370 may apply machine learning to predict a likelihood of a "bad" account—that is, an account in which the customer is delinquent, has its credit revoked, charged off, or is bankrupt with an account balance among a certain amount.

Risk engine 370 may implement machine learning as part of the underwriting process, such as to make predictions on profitability, whether the loan will be a "bad" loan, etc. Examples of suitable machine learning models that may be implemented by underwriting decision engine are disclosed in U.S. patent application Ser. No. 16/413,085, filed May 15, 2019.

Marketing data analytics engine 390 may identify offers to make to customers, and may track offers, keep data on customer interactions (e.g., clicks, hovers over, etc.), etc.

Fulfilment services 380 may cause the appropriate core service (e.g., auto loan, credit card, mortgage, etc.) to process accepted offers.

In one embodiment, reusable content templates that are channel and program agnostic and may be used to support programs.

Reusable marketing offer APIs may be used to provide personalized offers across channels and businesses based on a new banking architecture pattern.

Embodiments may deliver offers by a centralized decisioning platform.

Embodiments may provide a robust and scalable ad framework to provide customer experience across channels.

Figure 4:
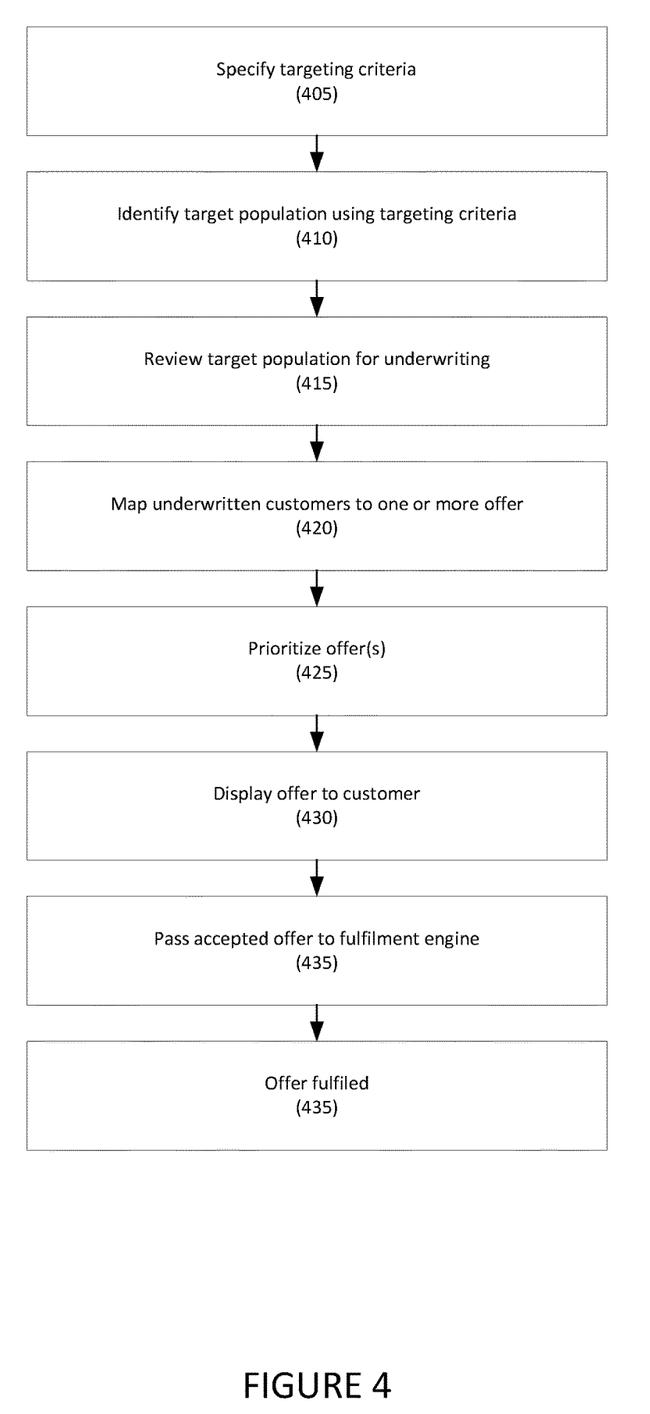
FIG. 4 depicts a method for pre-approving and pre-underwriting customers for financial products according to one embodiment.

Referring to FIG. 4, a method for pre-approving and pre-underwriting customers for financial products is disclosed according to one embodiment. In step 405, targeting criteria may be specified. In one embodiment, the targeting criteria may be based on current accounts with the financial institution (e.g., credit, auto loan, mortgage, etc.), assets, creditworthiness, credit risk, etc.

In one embodiment, machine learning may be used to identify the at least some of the targeting criteria. For example, historical data regarding accepted offers, profitability, likelihood of the account not becoming a "bad" account, etc. may be used to identity the targeting criteria.

Examples of suitable machine learning models that may be used are disclosed in U.S. patent application Ser. No. 16/413,085.

Other models, such a regression machine learning models, may be used as is necessary and/or desired.

In step 410, the targeting criteria may be used to identify a target population for the offer. For example, the population of customers that meet the targeting criteria may be the target population.

In step 415, each customer in the target population be reviewed for underwriting a financial product (e.g., an auto loan, a credit card, a mortgage, etc.). For example, each customer's creditworthiness may be evaluated using credit strategies and criteria. Further, each customer's income and assets (e.g., reported by the customer as part of the relationship, inferred from employer direct deposits, etc.), mortgage data, credit card data, auto and other loan data, deposit account balances, etc. may be considered. In addition, data form external sources, such as a credit bureau, may be considered.

In one embodiment, machine learning may be used to identify the at least some of the targeting criteria. The machine learning may be similar to that described in step 405, above.

If the customer passes underwriting, no further decisioning may be necessary to issue the offer to the customer once it is accepted. In one embodiment, the offer may expire after a predetermined amount of time.

In one embodiment, customers may be approved for different levels of underwriting. For example, offer terms (e.g., interest rate, term, amount of offer, etc.) may dynamically vary based on the level.

In one embodiment, an acquisition score may be calculated for each customer as part of the underwriting process. Customer behaviors during economic stress situations may further be calculated.

In step 420, the customers that pass underwriting may be mapped to one or more offer. For example, the customers may be mapped to an offer based on a perceived need (e.g., a customer without an auto loan, or that just paid off an auto loan, may be offered an auto loan). In one embodiment, the terms of the offer may be based on the level of underwriting that the customer passed.

In step 425, if more than one offer is available, the offers may be prioritized. For example, using machine learning, the offers may be prioritized based on an anticipated acceptance probability by the customer.

In step 430, the offer(s) may then be displayed to the customer using, for example, the customer's electronic device (e.g., in-app messaging, browser-based messaging, push notifications, manufacturer/retailer offers, etc.). In one embodiment, a content presentation engine may provide offer display rules to certain channels (e.g., website channel and mobile app channel) to control how the offers are presented to the customer.

In one embodiment, as discussed above, machine learning may be used to identify the communication channel for presentation of the offer.

In step 435, when a customer accepts an offer, the offer may be passed to a fulfilment engine.

In step 440, the offer may be fulfilled. For example, a gateway to fulfilment services may facilitate a flow to originate accounts with a fulfilment services so that fulfilment services can initiate account opening with the appropriate system in one or more core platform.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for presenting pre-approved and pre-underwritten offers to a customer, comprising:
   receiving, at a computer program executed by a computer processor for a financial institution, targeting criteria for a targeted offer for a financial product, wherein the targeting criteria identifies a likelihood that the customer will accept the targeted offer based on at least one of each customer's current accounts with the financial institution, each customer's assets, each customer's creditworthiness, and each customer's credit risk;
   identifying, by the computer program, a target population of customers for the targeted offer by applying the targeting criteria to a population of customers, wherein the target population is a subset of the population;
   reviewing, by a first machine learning model of the computer program, each customer in the target population for underwriting for the financial product, wherein the first machine learning model is trained to determine a risk associated with each customer based on inferred income for each customer and accounts that each customer has with the financial institution, wherein the underwriting is performed before the targeted offer is communicated;
   generating, by a second machine learning model of the computer program, static content and dynamic content for the targeted offer, wherein the second machine learning model is trained to generate dynamic content that is specific to each customer;
   determining, by the computer program and based on at least one prior offer, a two-way communication channel out of a plurality of available two-way communication channels consisting of text messaging, in-app messaging, browser-based messaging, and email to present the targeted offer directly to one of the customers that passed underwriting;
   applying, by the computer program, a display rule for the two-way communication channel to the targeted offer, wherein the display rule controls how the static content and the dynamic content are presented on a customer electronic device;
   communicating, by the computer program, the targeted offer directly to the customer over the two-way communication channel, wherein the customer electronic device is configured to receive the targeted offer and present the static content and the dynamic content in an ad framework according to the display rule;
   receiving, by the computer program and over the two-way communication channel, acceptance of the targeted offer; and
   providing, by the computer program, the accepted targeted offer to a fulfilment engine, wherein the fulfilment engine initiates an account opening for the financial product.

2. The method of claim 1, wherein the population of customers comprises customers of the financial institution.

3. The method of claim 1, wherein the targeting criteria is further based on a likelihood that the customer will not default on the financial product.

4. The method of claim 1, wherein the two-way communication channel comprises a third-party provider of goods or services associated with the financial product.

5. The method of claim 1, wherein the underwriting comprises a plurality of levels, and the customer is approved for one of the plurality of levels.

6. The method of claim 5, wherein each level is associated with a term for the financial product, the term including at least one of an interest rate and an amount.

7. The method of claim 1, wherein the customer is approved for a plurality of targeted offers, and further comprising:
   prioritizing the targeted offers to the customer;
   wherein the targeted offers are presented based on the prioritization.

8. The method of claim 7, wherein the prioritization is based on an anticipated acceptance probability of each targeted offer.

9. The method of claim 1, wherein the ad framework is configured to assemble the static content and the dynamic content and display the assembled static content and dynamic content.

10. A system for presenting pre-approved and pre-underwritten offers to a customer, comprising:
- a financial institution backend for a financial institution comprising:
  - a marketing campaign management service;
  - an offer eligibility service;
  - a credit decisioning service;
  - a content presentation engine;
  - a plurality of systems of record;
  - an offer acceptance engine;
  - a fulfilment engine; and
  - a database comprising a customer profiles for a population of customers;
- wherein:
  - the marketing campaign management service provides targeting criteria for a targeted offer for a financial product, wherein the targeting criteria identifies a likelihood that the customer will accept the targeted offer based on at least one of each customer's current accounts with the financial institution, each customer's assets, each customer's creditworthiness, and each customer's credit risk;
  - the offer eligibility service identifies a target population of customers for the targeted offer by applying the targeting criteria to the population of customers in the database, wherein the target population is a subset of the population of customers;
  - the credit decisioning service, via a first machine learning model, reviews each customer in the target population for underwriting for the financial product, wherein the first machine learning model is trained to determine a risk associated with each customer based on inferred income for each customer and accounts that each customer has with the financial institution from the systems of record, wherein the underwriting is performed before the targeted offer is communicated;
  - the credit decisioning service, via a second machine learning model, determines static content and dynamic content for the targeted offer, wherein the second machine learning model is trained to generate dynamic content that is specific to each customer;
  - the offer eligibility service determines a two-way communication channel out of a plurality of available two-way communication channels consisting of text messaging, in-app messaging, browser-based messaging, and email to present the targeted offer to one of the customers that passed underwriting based on at least one prior offer;
  - the content presentation engine applies a display rule for the two-way communication channel to the targeted offer, wherein the display rule controls how the static content and the dynamic content are presented on a customer electronic device;
  - the content presentation engine communicates the targeted offer directly to the customer over the two-way communication channel, wherein the customer electronic device is configured to receive the targeted offer and present the static content and the dynamic content in an ad framework according to the display rule;
  - the offer acceptance engine receives, over the two-way communication channel, acceptance of the targeted offer; and
  - the offer acceptance engine provides the accepted targeted offer to a fulfilment engine, wherein the fulfilment engine initiates an account opening for the financial product.

11. The system of claim 10, wherein the population of customers comprises customers of the financial institution.

12. The system of claim 10, wherein the targeting criteria is further based on a likelihood that the customer will not default on the financial product.

13. The system of claim 10, wherein the two-way communication channel comprises a third-party provider of goods or services associated with the financial product.

14. The system of claim 10, wherein the underwriting comprises a plurality of levels, and the customer is approved for one of the plurality of levels.

15. The system of claim 14, wherein each level is associated with a term for the financial product, the term including at least one of an interest rate and an amount.

16. The system of claim 10, wherein the customer is approved for a plurality of targeted offers, and the offer eligibility service prioritizes the targeted offers and presents the targeted offers based on the prioritization.

17. The system of claim 16, wherein the prioritization is based on an anticipated acceptance probability of each targeted offer.

18. The system of claim 10, wherein the ad framework is configured to assemble the static content and the dynamic content and display the assembled static content and dynamic content.

* * * * *